W. J. KERR.
INVALID-BEDSTEAD.

No. 170,090. Patented Nov. 16, 1875.

WITNESSES:
P. C. Dieterich
W. C. McArthur

INVENTOR:
W. J. Kerr
per T. K. Alexander
ATTORNEY.

UNITED STATES PATENT OFFICE.

WILLIAM JAMES KERR, OF SPRINGFIELD, MISSOURI.

IMPROVEMENT IN INVALID-BEDSTEADS.

Specification forming part of Letters Patent No. 170,090, dated November 16, 1875; application filed April 16, 1875.

*To all whom it may concern:*

Be it known that I, W. J. KERR, of Springfield, in the county of Green and State of Missouri, have invented certain new and useful Improvements in Invalid-Bedsteads; and I do hereby declare that the following is a full, clear, and exact description thereof, reference being had to the accompanying drawings and to the letters of reference marked thereon, which form a part of this specification.

The nature of my invention consists in the construction and arrangement of a spring-incline attachment that can be readily and easily attached to all ordinary bedsteads, and that can be raised and lowered to any incline that suits the taste and comfort of the user.

In order to enable others skilled in the art to which my invention appertains to make and use the same, I will now proceed to describe its construction and operation, referring to the annexed drawing, in which—

Figure 1:
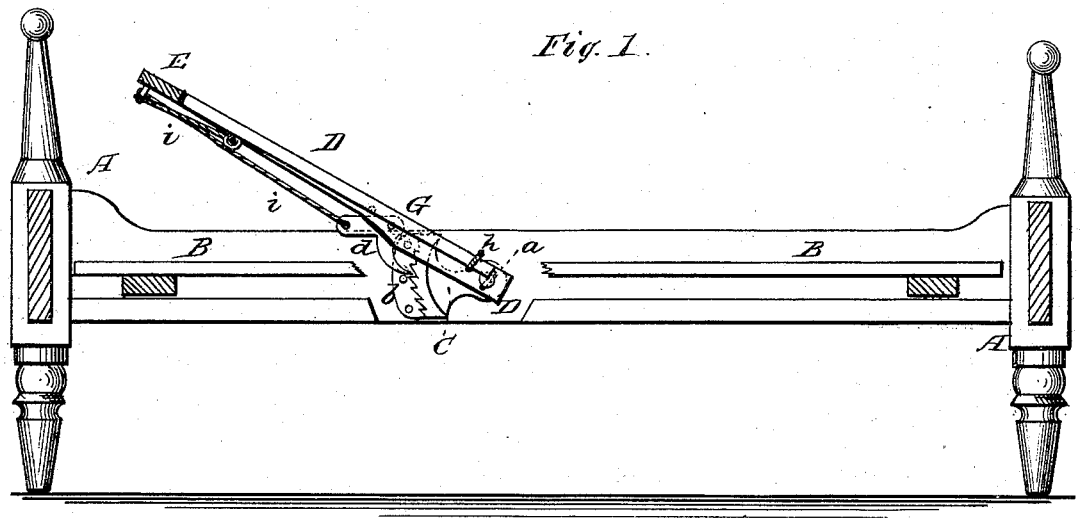
Figures 2, 4:
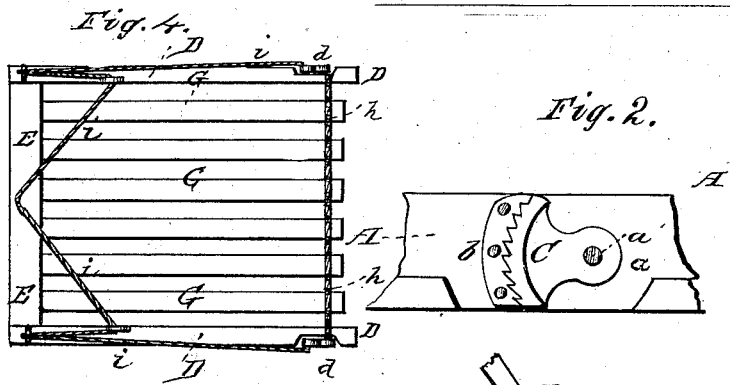
Figure 3:
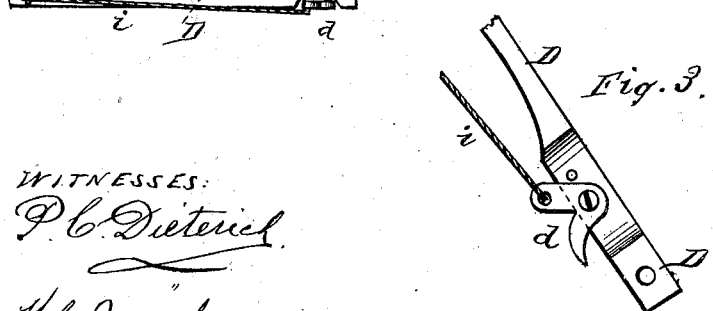

Figure 1 is a central vertical section of my bedstead, and Figs. 2, 3, and 4 are views in detail of portions thereof.

A represents an ordinary bedstead with bed-slats B B. To the side rails of the bedstead, on the inner side, a suitable distance from the head-board, are fastened plates C C, one on each rail. These plates are on their front ends provided with projecting pins $a$, upon which the ends of the spring-bars D D are placed. The other or rear ends of the plates C are provided with a notched segment, $b$, to receive the dog or pawl $d$, which is made with a heavy falling end or tine to insure its catching in the segment. The spring-bars D D are made of springy timber or metal, and are made thinner and in spring shape from the points where the dogs are fastened and gradually tapering to the top, where they are bolted to a broad head-piece, E. Into this head-piece are let a series of slats, G G, the lower ends of which are notched on each side to hold the cord or springs $h$. This cord is also attached to the lower ends of the side spring-bars D D, and tied in the notches on the end of each slat, leaving it a little slack between the slats so as to let them swing over the slats B of the bed-bottom, in all bedsteads where said slats run longitudinally. Where the bed-slats run crosswise the cord $h$ may be made taut, and of sufficient size and strength to support the lower end of the incline. The lower ends of the slats G are held a proper distance apart by their upper ends being let into and secured on the broad head-piece E. Attached to the dogs $d$ $d$ is a small cord, $i$, which passes through suitable staples on the incline, and hangs down in the center at the top thereof. The incline may be raised by simply lifting the head-piece, the dogs $d$ passing over the notched segments; but to lower the incline, the dogs must be raised by pulling on the cord $i$. This attachment may be applied to any bedstead. The plates C C are made right and left hand, and the spring-bars D are keyed on the pins or pivots $a$.

Having thus fully described my invention, what I claim as new, and desire to secure by Letters Patent, is—

1. The combination of the broad head-piece E, spring side bars D D, and slats G G, united at their lower ends by a cord, $h$, substantially as and for the purposes herein set forth.

2. The plates C, provided with the pivots $a$, and notched segments $b$, in combination with the incline D E G, pawls $d$, and cord $i$, substantially as and for the purposes herein set forth.

In testimony that I claim the foregoing as my own I affix my signature in presence of two witnesses.

WILLIAM JAMES KERR.

Witnesses:
L. H. NEWTON,
JOHN GRAVES.